Aug. 29, 1933.  F. J. GIBBONS  1,924,184
SHOCK ABSORBER
Filed May 27, 1929  2 Sheets-Sheet 1
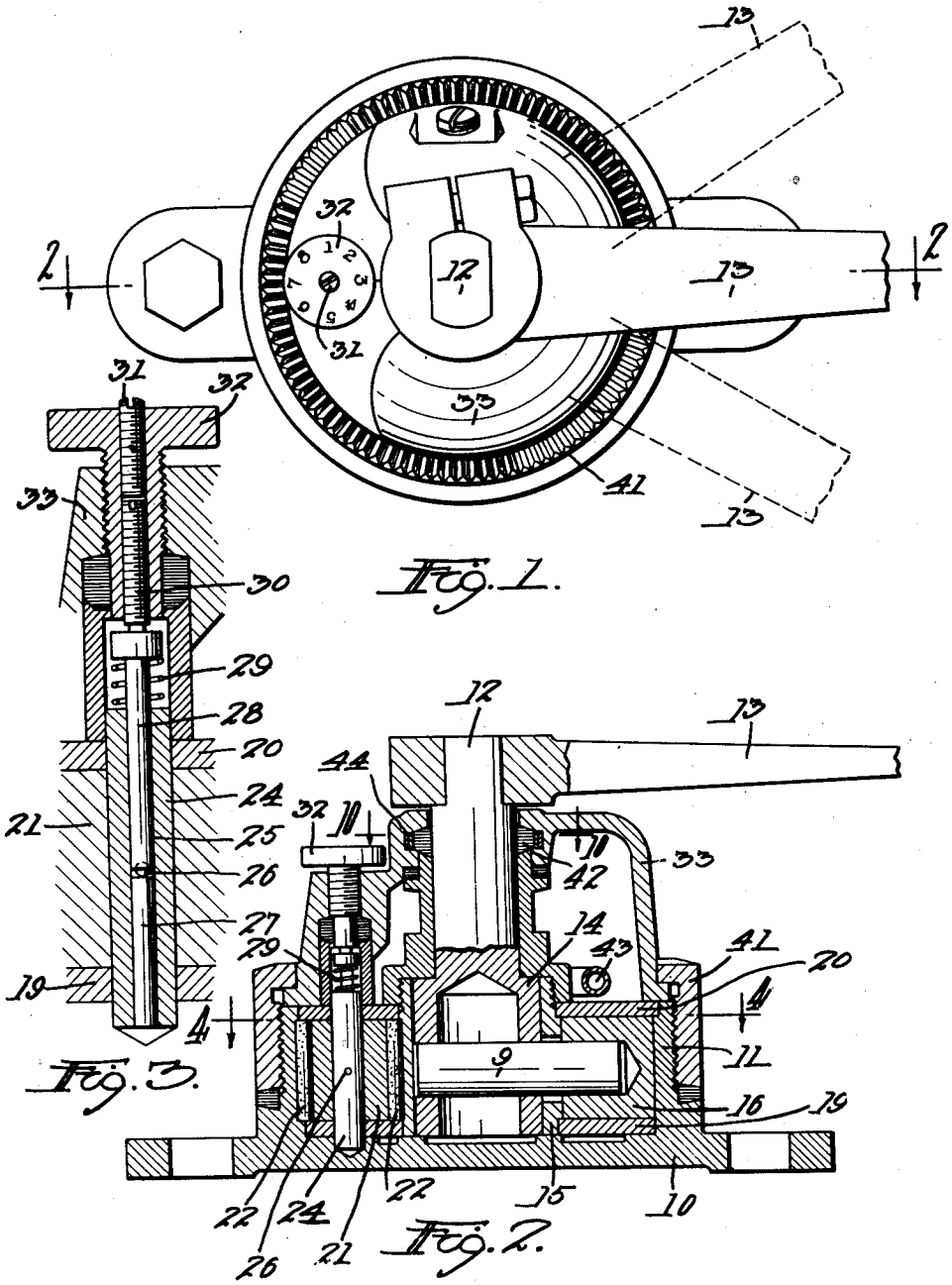

Aug. 29, 1933.  F. J. GIBBONS  1,924,184
SHOCK ABSORBER
Filed May 27, 1929  2 Sheets-Sheet 2
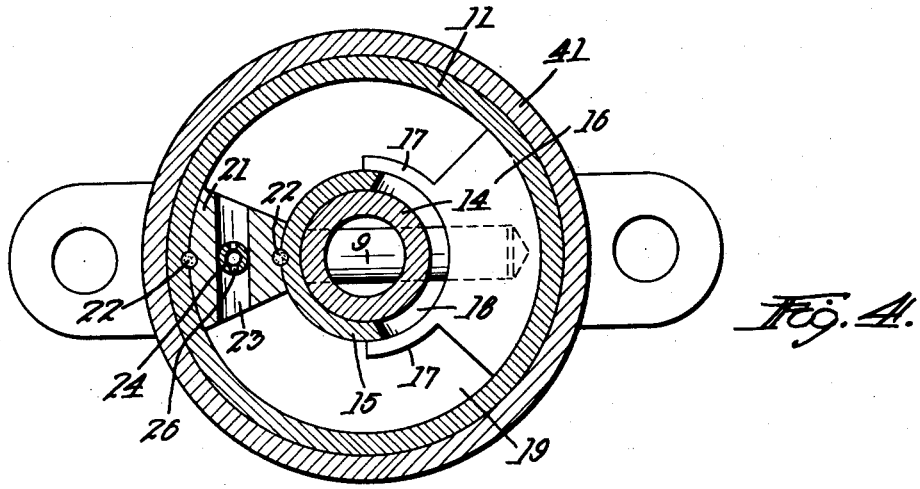
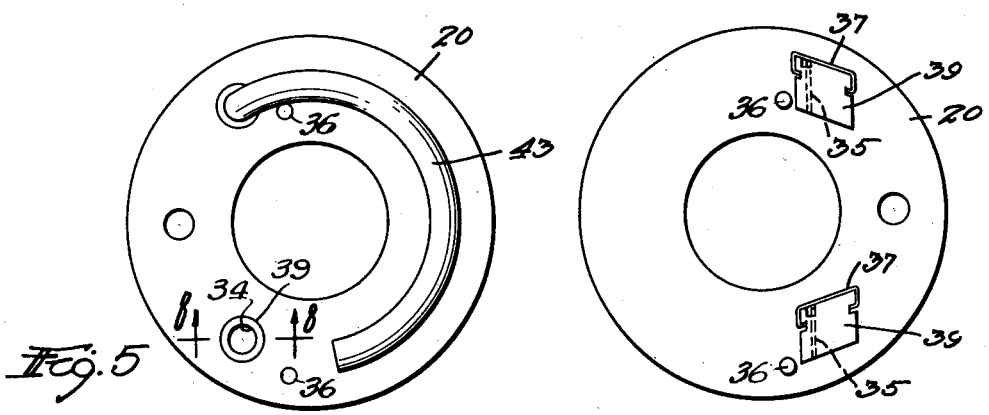
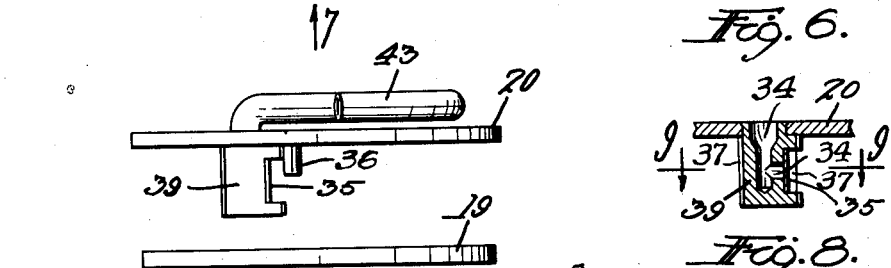
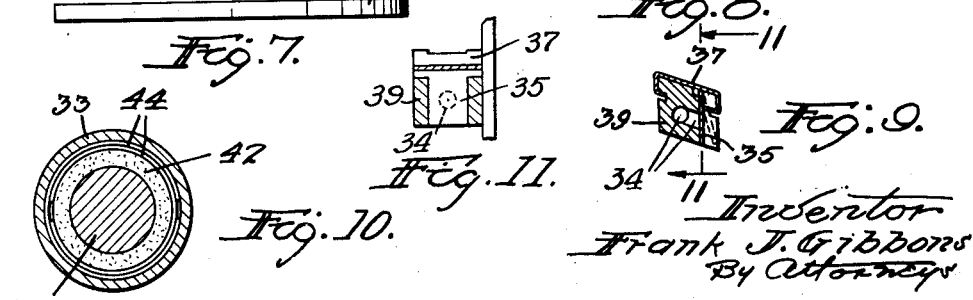
Inventor
Frank J. Gibbons
By Attorneys
Southgate Fay & Hawley Patented Aug. 29, 1933

1,924,184

UNITED STATES PATENT OFFICE 1,924,184

SHOCK ABSORBER

Frank J. Gibbons, Worcester, Mass.

Application May 27, 1929. Serial No. 366,122

8 Claims. (Cl. 188—89)

This invention relates to a shock absorber of the oscillating hydraulic type.

The principal objects of the invention are to provide means for imparting a maximum resistance with the fewest mechanical parts; to provide an arrangement in which the oscillating piston is not fixed to the shaft and does not impart much pressure to the shaft or its bearings; to provide a construction in which the two work chambers can be separated without danger of any increased wear and in which there is no danger of fluid passing by, except through the fluid control valve intended for that purpose; to provide means for cutting down and compensating for any loss of fluid from the working chamber, thus increasing the resistance; to provide a type of valve connected with a supply pipe for the fluid that takes up the loss of fluid in the upper work chamber, thus cutting down lost motion; to provide means whereby it is impossible for the fluid to pass from the working chamber to the non-resistance chamber and to provide a construction in which the flanges can be ground to insure perfect surfaces working against each other.

Other objects and advantages of the invention will appear hereinafter.

Reference is to be had to the accompanying drawings in which

Fig. 1 is an end view of a shock absorber constructed in accordance with this invention;

Fig. 2 is a diametrical sectional view on the line 2—2 of Fig. 1;

Fig. 3 is a sectional view of the means for controlling the passage of fluid from one chamber to the other on enlarged scale;

Fig. 4 is a sectional view on the line 4—4 of Fig. 2;

Fig. 5 is a plan of the bottom of the fluid supply chamber;

Fig. 6 is a bottom plan view of the upper disc of the device;

Fig. 7 is an edge view as indicated by the arrow 7 in Fig. 5;

Fig. 8 is a sectional view on the line 8—8 of Fig. 5;

Fig. 9 is a sectional view on the line 9—9 of Fig. 8;

Fig. 10 is a sectional view on the line 10—10 of Fig. 2, and Fig. 11 is a sectional view on the line 11—11 of Fig. 9.

I have shown this shock absorber as comprising a base 10 adapted to be secured to the chassis of an automobile or in any desired place and having an exteriorly threaded cylindrical wall 11 extending outwardly from it which is provided with a cylindrical work chamber therein in which most of the parts are located. Concentrically located within this chamber is the work shaft 12 which is provided with an arm 13 connected with a relatively movable part of the car so as to be turned when the car receives a jar or vibration.

This shaft 12 is provided with a hub 14 reaching to the base 10 and cylindrical in shape on which hub is a sleeve 15 which is not keyed to the hub or shaft but is free thereon but is fixed in position otherwise. The outer circumference of this sleeve is finished off and constitutes a bearing for the moving wing 16 of the apparatus. This wing has a pair of flanges 17 and is turned or ground to fit the sleeve on which it has its bearing.

On account of this construction the pressure exerted on the shaft 12 by the oscillating piston or wing 16 is reduced and the bearing surface of the latter is increased in area. The shaft 12 is provided with a pin 9 which extends through an arcuate slot 18 in the fixed sleeve 15, this slot extending nearly half way around the sleeve. The pin is fixed in the wing or piston 16 so that this part is fixed to the shaft by the pin and the wing has a bearing on the stationary sleeve outside the shaft.

The wing 16 operates in the work chamber which is bounded on one side by a disc 19 and on the other by a disc 20, both annular in form and both ground to finish them properly for the sliding motion of the wing 16. The disc 19 is set into the base between the inner wall of the projecting part 11 and a notch in the end of the fixed sleeve 15. The disc 20 is set on a shoulder on the sleeve 15 and into a shoulder in the projecting wall 11.

In the cylindrical space in the wall 11 on one side is located an interrupter base 21. This is a sector shaped member. The interior of the wall 11 constituting a chamber can be turned or ground to a cylindrical shape inside on an ordinary machine, which is one of the advantages of this invention. This interrupter base 21 is secured to it in stationary position and to the sleeve 15 so that these three parts are all fixed in stationary position by a couple of raw hide keys 22. These keys are set into recesses bored, a part in one member and a part in the other and so lock these parts in stationary position.

The base 21 is provided with a passage 23 therethrough from one side to the other. In this passage is a valve for regulating the passage of liquid back and forth therethrough. The valve consists of a tube 24 having a longitudinal passage 25 therethrough and a transverse port 26. In the longitudinal passage is a pin 27 at the bottom or end which performs no function except to fill the passage beyond the port 26. Above is a piston 28, the head of which is forced up by a spring 29 and which has a screw-threaded portion 30 and a lock screw 31 in a screw threaded passage in a regulating head 32 which is screwed in the casing 33 which supports it. Obviously the piston 28, which is a valve, can be moved up and down to reduce the port 26 to any desired effective area. The head 32 is provided with a scale and the casing 33 with a zero point.

The upper disc 20 is provided with two ports 34 the lower ends of which are closed by clapper valves 35. These ports are L-shaped passages in members 39. These valves are each pivoted or loosely mounted on the members 39 and each one is provided with a spring 37 normally holding the valves. Each of the valves 35 is provided with opposite projections or trunnions at its upper end which are received in slots in the member 39. Displacement from these slots is prevented by spring members 37 and the valves are kept closed by these spring members. When the pressure becomes sufficient to overcome the resistance of the springs the valves will open against stop pins 36. These clapper valves confine the fluid in a practical manner and cut down the loss of fluid from the working chamber thus maintaining the resistance at a high point. The parts so far described constitute the chamber of the shock absorber.

Mounted at the end of the wall 11 is a reservoir shell 33 which is held against the wall 11 by a nut 41 and which furnishes the support for the regulating head 32 and is provided with a packing 42 for the shaft 12 at its outer end. Behind the packing are two semi-circular springs 44 for holding the packing tight. This reservoir is filled with oil or other liquid and within it is a curved supply tube 43 which terminates at one end over one of the valves 35 and at the other end is open. The two members 39 are nearly diametrically opposite, one above and one below the center. The curved tube opens at a low point so that if the reservoir is only half full both the ports will perform their function. It will be understood that, as the wing 16 moves back and forth, any deficiency in oil in the inner chamber of the wall 11 will be compensated for by the introduction of oil through the ports covered by the clapper valves 35.

In operation it will be understood that the regulating wheel 32, which is provided with numerals as indicated on the top of Fig. 2, can be turned after the screw 31 is loosened to regulate the effective opening of the valve port 26. Then until another adjustment, this remains constant.

The oscillation of the part to which the arm 13 is connected will swing the shaft 12 and consequently the wing 16 back and forth. In each case the oil or liquid passing from one side to the other is restricted by the port 26 and this restriction is the same on both the upward and the downward stroke. The operation therefore will be obvious.

Either side of the chamber in the wall 11 in which the wing 16 oscillates will be supplied when necessary by oil from the reservoir 33 through one valve 35 or the other and no oil can escape backwardly through these valves no matter what the pressure might be. There is no chance of oil passing through the base 21 except through the port 26 because of the raw hide packings 22. The placing of the bearing of the wing 16 on a stationary sleeve of a diameter so much larger than that of the shaft provides a better wearing and bearing surface than has been the case heretofore and relieves the shaft of a considerable proportion of the wear that it usually receives in this general type of shock absorber. The supply of liquid to the two sides of the working chamber is instantaneous and efficient and also non-leaking. The other objects above mentioned are also accomplished with this device.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. In a shock absorber, the combination with a base adapted to be secured to a fixed part and having a wall projecting therefrom and constituting a work chamber, of a shaft located in the work chamber, an interrupted base on one side of said chamber in fixed position having a port therethrough for allowing liquid to pass, a stationary sleeve on the shaft, a wing oscillatably mounted on said sleeve, means carried by the shaft for operating the wing, said means projecting through the sleeve, opposite discs in said chamber fixed in position to prevent passage of liquid thereby, a reservoir for liquid beyond one disc, ports through the latter disc on each side of said wing and clapper valves for controlling said ports to admit liquid and prevent its escape as the wing vibrates to compensate for the loss of liquid.

2. In a shock absorber, the combination with a casing having a chamber therein located in fixed position, of an interrupter base fixed in the chamber, a shaft in the chamber, a stationary sleeve surrounding said shaft and engaging said base, said base and sleeve on one side and wall of the chamber on the other having cylindrical bores therein and raw hide packing in said bores to prevent the passage of liquid, an oscillatable wing to which said shaft is connected, said wing having its bearing on said sleeve, a reservoir for liquid at the end of said chamber separated therefrom, said chamber having ports on opposite sides of the wing, clapper valves normally closing said ports and a distributor pipe extending from the lower side of the reservoir to one of said ports on the upper side, whereby the liquid will be conducted to both of said ports from the lower side.

3. In a shock absorber, the combination with a chamber adapted to be fixed, of a shaft therein, a fixed sleeve on the shaft, an oscillatable wing fixed to the shaft and movable therewith, an arm on the shaft connected with a movable part of the machine for oscillating the shaft, an interrupter base in fixed position filling the space between the side of the chamber opposite the wing when the wing is in neutral position and the sleeve, a chordal passage through said base, a longitudinal tube filling said passage and having a port extending transversely therethrough, and a longitudinal piston for adjusting the effective opening of said port.

4. In a shock absorber, the combination with a chamber adapted to be fixed, of a shaft therein, a fixed sleeve on the shaft, an oscillatable wing fixed to the shaft and movable therewith, an arm on the shaft connected with a movable part of the machine for oscillating the shaft, an interrupter base filling the space between the sleeve and the side of the chamber opposite the wing when the wing is in neutral position, a passage through said base, a tube filling said passage and having a port extending transversely therethrough, a piston in said tube for controlling the effective opening of said port, yielding means for opening the port through said piston and means for adjusting the piston.

5. In a shock absorber, the combination with a casing having a chamber therein located in fixed position, of an interrupter base fixed in the chamber, a shaft in the chamber, a sleeve surrounding said shaft and engaging said base, an oscillatable wing to which said shaft is connected, said wing having its bearing on said sleeve, a reservoir for liquid, said chamber having ports on opposite sides of the wing, valves normally closing said ports and a distributor pipe extending from the lower side of the reservoir to one of said ports on the upper side, whereby the liquid will be conducted to both of said ports from the lower side.

6. In a shock absorber, the combination with a cylindrical casing with its flat ends vertical and having a work chamber therein, and a central shaft, the casing and shaft being connected to two relatively movable elements of the machine to which the shock absorber is to be applied, of an oscillatable wing in the work chamber fixed to one of the first named members, an interrupter base in the work chamber fixed to the other, said interrupter having a valved passage from one side to the other, manually operated means for adjusting the valve, a reservoir shell fixed to the casing and connected to said work chamber by two ports, one above and one below the valved passage, said ports having means for closing them to open when the pressure rises above their resistance, said reservoir being filled normally with liquid, and a tube extending from the upper port to a point near the bottom of the reservoir, whereby even if the liquid level in the reservoir is low both ports will be in communication with it and any deficiency in said chamber will be compensated for from said reservoir.

7. In a shock absorber, the combination with a casing having a work chamber therein, and a central shaft, the casing and shaft being connected to two relatively movable elements of the machine to which the shock absorber is to be applied, of an oscillatable wing in the work chamber fixed to one of the first named members, an interrupter base in the work chamber fixed to the other, said interrupter having a valved passage from one side to the other, a reservoir shell fixed to the casing and connected to said work chamber by two ports, one above and one below the valved passage, said ports having means for closing them to open when the pressure rises above their resistance, said reservoir being filled normally with liquid, and a tube extending from the upper port to a point near the bottom of the reservoir, whereby even if the liquid level in the reservoir is low both ports will be in communication with it and any deficiency in said chamber will be compensated for from said reservoir.

8. In a shock absorber, the combination with a casing having a chamber therein located in fixed position, of an interrupter base fixed in the chamber and dividing said chamber into two working chambers, means for resisting the flow of liquid from each working chamber, a shaft in the chamber, an arcuate sleeve surrounding said shaft and engaging said base, an oscillatable wing to which said shaft is connected, said wing having its bearing on said sleeve, and a valved passage from one side of the interrupter base to the other.

FRANK J. GIBBONS.